US010222734B2

(12) United States Patent
Kozaki et al.

(10) Patent No.: US 10,222,734 B2
(45) Date of Patent: Mar. 5, 2019

(54) MEDIUM TRANSPORT APPARATUS AND IMAGE READING APPARATUS (71) Applicant: SEIKO EPSON CORPORATION, Tokyo (JP)

(72) Inventors: Kohei Kozaki, Matsumoto (JP); Kensuke Tamai, Shiojiri (JP); Shinji Kanemaru, Matsumoto (JP); Hitoshi Igarashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/631,753

(22) Filed: Jun. 23, 2017

(65) Prior Publication Data
US 2018/0004144 A1   Jan. 4, 2018

(30) Foreign Application Priority Data

Jun. 29, 2016  (JP) .................. 2016-129068

(51) Int. Cl.
B65H 3/06 (2006.01)
H04N 1/00 (2006.01)
G03G 15/00 (2006.01)
B65H 5/06 (2006.01)
B65H 85/00 (2006.01)

(52) U.S. Cl.
CPC ........... *G03G 15/6529* (2013.01); *B65H 3/06* (2013.01); *B65H 5/062* (2013.01); *B65H 85/00* (2013.01); *G03G 15/602* (2013.01); *H04N 1/0057* (2013.01); *H04N 1/00588* (2013.01); *H04N 1/00795* (2013.01); *B65H 2301/33312* (2013.01); *B65H 2402/22* (2013.01); *B65H 2402/31* (2013.01); *B65H 2403/512* (2013.01);

(Continued)

(58) Field of Classification Search
CPC ...... B65H 2801/39; B65H 3/06; B65H 5/062; G03G 15/6529; H04N 1/0057; H04N 1/00588; H04N 1/00795
USPC ......... 399/111, 327, 121, 301, 329, 66, 107, 399/110, 114, 122, 299, 302, 316, 45, 69, 399/70; 271/10.02, 10.1, 10.13, 110, 117, 271/121, 152, 160, 176, 227, 245, 264, 271/265.01, 274; 358/474, 498
See application file for complete search history.

(56) References Cited

U.S. PATENT DOCUMENTS 5,899,613 A * 5/1999 Koike ................. B41J 11/26
271/9.1
6,167,232 A * 12/2000 Jimenez ............. B41J 13/103
358/498

(Continued)

FOREIGN PATENT DOCUMENTS

JP   2012-180216 A   9/2012

*Primary Examiner* — Negussie Worku
(74) *Attorney, Agent, or Firm* — Workman Nydegger (57) ABSTRACT A moving-side roller reliably separates from a stationary-side roller so as to enable appropriate document transport. An image reading apparatus causes a roller support member supporting the moving-side roller to come into contact with the stationary-side roller. A contact state and a separation state can be switched. The image reading apparatus includes an external force providing portion to exert a third external force on the roller support member in a direction for restraining warping that is generated in the roller support member by a first external force that a cam exerts on the roller support member and by a second external force that an urging device exerts on the roller support member.

9 Claims, 10 Drawing Sheets (52) U.S. Cl.
CPC .. *B65H 2404/1441* (2013.01); *B65H 2601/24* (2013.01); *B65H 2801/39* (2013.01)

(56) References Cited

U.S. PATENT DOCUMENTS

| | | | | |
|---|---|---|---|---|
| 2005/0242493 | A1* | 11/2005 | Agata | B65H 5/062 |
| | | | | 271/226 |
| 2005/0285327 | A1* | 12/2005 | Suzuki | B65H 3/0661 |
| | | | | 271/109 |
| 2014/0084531 | A1* | 3/2014 | Fukumoto | B65H 3/06 |
| | | | | 271/10.1 |
| 2015/0203307 | A1* | 7/2015 | Tanaka | B65H 3/0669 |
| | | | | 271/117 |
| 2015/0257880 | A1* | 9/2015 | Bortlein | A61F 2/2418 |
| | | | | 623/2.11 |
| 2016/0028915 | A1* | 1/2016 | Kozaki | H04N 1/1013 |
| | | | | 358/497 |
| 2016/0360073 | A1* | 12/2016 | Hatayama | H04N 1/6075 |
| 2017/0142270 | A1* | 5/2017 | Kozaki | H04N 1/00525 |
| 2017/0227908 | A1* | 8/2017 | Nunokawa | G03G 15/607 |
| 2017/0355542 | A1* | 12/2017 | Shima | B65H 5/062 |
| 2018/0041651 | A1* | 2/2018 | Nakamura | H04N 1/00588 |

\* cited by examiner

MEDIUM TRANSPORT APPARATUS AND IMAGE READING APPARATUS

BACKGROUND

1. Technical Field

The entire disclosure of Japanese Patent Application No. 2016-129068, filed Jun. 29, 2016 is expressly incorporated by reference herein in its entirety.

The present invention relates to a medium transport apparatus for transporting a medium and to an image reading apparatus including the medium transport apparatus.

2. Related Art

An example of an image reading apparatus is a scanner. A type of scanner includes an automated document feeding device (otherwise called an "Auto Document Feeder" or "ADF") and is configured to automatically feed and read a plurality of documents (otherwise called "media"). A plurality of documents are fed into and read by an image reading unit that is provided on a downstream side of the auto document feeder in the document transport direction.

Japanese patent literature JP-A-2012-180216 discloses a scanner apparatus that can read both sides of a document in succession. The scanner apparatus disclosed in JP-A-2012-180216 is configured to read the first side of a document and then switchback and return the document to the apparatus to feed it to a reverse feed path and read the second side of the document.

Switchback of the document is performed by a discharge roller pair provided at a position where the document is discharged. The discharge roller pair includes a stationary-side roller and a moving-side roller and is configured to allow the moving-side roller to come into contact with, and separate from, the stationary-side roller. The moving-side roller and the stationary-side roller are configured to come into contact with, and separate from, the stationary-side roller in order to suppress the document from being subjected to back tension when the document is nipped by the discharge roller pair while the front edge of the document is transported by an advancing roller pair during reading of the second side. In addition, when the course of a long document is reversed, the front edge and the rear edge of the document may be simultaneously nipped by the discharge roller pair, which needs to be avoided.

In the scanner apparatus disclosed in JP-A-2012-180216, the moving-side roller is supported by a roller support member. The roller support member is provided in such a manner that it can shift its position so as to cause the moving-side roller to be in contact with, or separate from, the stationary-side roller, and the moving-side roller is urged by a spring in a direction in which the moving-side roller comes into contact with the stationary-side roller. Moreover, the scanner apparatus has a configuration in which a cam that engages the roller support member pushes the roller support member upward against the urge of the spring so as to cause the moving-side roller to separate from the stationary-side roller.

However, if the layout of the apparatus requires a change in the positions at which the spring urges the roller support member and the cam pushes it upward, the roller support member may warp because external forces are exerted on the roller support member at positions that do not align with the longitudinal direction (document width direction) of the roller support member. The warping may cause the moving-side roller to insufficiently separate from the stationary-side roller in spite of the cam pushing the roller support member upward. This may lead to failure to transport the document appropriately.

SUMMARY

An advantage of some aspects of the invention is that the moving-side roller is made to separate reliably from the stationary-side roller so as to enable appropriate document transport.

A medium transport apparatus according to a first aspect of the invention includes a medium transport roller pair having a stationary-side roller disposed on a medium transport path along which a medium is transported and a moving-side roller formed so as to be able to come into contact with, or separate from, the stationary-side roller; a roller support member formed so as to support the moving-side roller and be able to assume a first state in which the roller support member causes the moving-side roller to be in contact with the stationary-side roller and a second state in which the roller support member causes the moving-side roller to separate from the stationary-side roller; an urging device urging the roller support member toward the first state; a cam formed so as to engage the roller support member and shift the roller support member from the first state to the second state against an urging force of the urging device; and an external force providing portion to exert, while the roller support member is shifted by the cam to be in the second state, a third external force on the roller support member in a direction for restraining warping that is generated in the roller support member by a first external force that the cam exerts on the roller support member and by a second external force that the urging device exerts on the roller support member.

In accordance with the first aspect, the medium transport apparatus includes the external force providing portion to exert, while the roller support member is shifted by the cam to be in the second state, the third external force on the roller support member in the direction for restraining warping that is generated in the roller support member by the first external force that the cam exerts on the roller support member and by the second external force that the urging device exerts on the roller support member. Thus, even when the position at which the first external force acts needs to be shifted from the position at which the second external force acts, the warping of the roller support member can be restrained due to the third external force exerted by the external force providing portion, and the moving-side roller can reliably separate from the stationary-side roller, thereby enabling appropriate document transport.

A second aspect of the invention is that, in the medium transport apparatus according to the first aspect, the external force providing portion abuts an abutting portion provided in the roller support member when the roller support member is shifted by the cam to be in the second state.

In accordance with the second aspect, the external force providing portion abuts the abutting portion provided in the roller support member when the roller support member is shifted by the cam to be in the second state so that the external force providing portion does not need to be operated and thus the external force providing portion can be formed in a structurally simple and low-cost configuration.

A third aspect of the invention is that, in the medium transport apparatus according to the first aspect, the first external force and the second external force act on the roller support member at symmetrical positions with respect to a center position of the roller support member in a rotation axis direction of the moving-side roller, and the third external force acts on the roller support member at the center position of the roller support member or at symmetrical positions with respect to the center position in the rotation axis direction of the moving-side roller.

In accordance with the third aspect, the restraining action suppressing warping of the roller support member due to the third external force balances the warping action of the roller support member due to the first external force and the second external force. This enables the shape of the roller support member to be favorably maintained.

A fourth aspect of the invention is that, in the medium transport apparatus according to the first aspect, the first external force and the second external force act on the roller support member at different positions in a medium transport direction, and the third external force acts on the roller support member at a position between the position at which the first external force acts and the position at which the second external force acts in the medium transport direction.

In accordance with the fourth aspect, the first external force and the second external force act on the roller support member at different positions in a medium transport direction, and the third external force acts on the roller support member at a position between the position at which the first external force acts and the position at which the second external force acts in the medium transport direction. Thus, even when the position at which the first external force acts needs to be shifted from the position at which the second external force acts in the medium transport direction due to layout requirements in the apparatus, the extent in which the first, second, and third external forces act can be minimized, and thereby deformation of the roller support member in the medium transport direction can be minimized.

A fifth aspect of the invention is that, in the medium transport apparatus according to the first aspect, the roller support member includes a plurality of the moving-side rollers provided in a rotation axis direction of the moving-side rollers and a plurality of rotating shafts of the moving-side rollers provided in the rotation axis direction, and each of the rotating shafts includes a plurality of the moving-side rollers provided at symmetrical positions with respect to a center position of each of the rotating shafts in the rotation axis direction. In addition, the urging device urges the roller support member at the center positions of each of the rotating shafts in the rotation axis direction.

In accordance with the fifth aspect, the urging device, which urges the roller support member at the center position of each rotating shaft in the rotation axis direction, enables a plurality of the moving-side rollers supported by each rotating shaft to enable well-balanced contact with a medium.

An image reading apparatus according to a sixth aspect of the invention includes a reading unit reading a side of a medium and the medium transport apparatus according to the first aspect that is provided at a position at which a medium read by the reading unit is discharged from the image reading apparatus. The sixth aspect enables the image reading apparatus to provide effects similar to those of the first aspect.

A seventh aspect of the invention is that, in the image reading apparatus according to the sixth aspect, the image reading apparatus further includes a medium support portion provided above the roller support member so as to support a medium that is transported toward the reading unit, and the medium support portion includes a frictional member providing a frictional force between the medium support portion and a supported medium. In addition, the external force providing portion is formed in the medium support portion on a side opposing the roller support member and is arranged at a position that is shifted from a position of the frictional member in a medium transport direction.

In accordance with the seventh aspect, the external force providing portion is arranged at a position shifted from the position of the frictional member in the medium transport direction so that the thickness of the medium support portion can be reduced, thereby leading to a reduction in the height of the apparatus.

An eighth aspect of the invention is that, in the image reading apparatus according to the seventh aspect, at least a portion of the frictional member and at least a portion of the external force providing portion overlap each other in a direction orthogonal to a medium support surface of the medium support portion.

In accordance with the eight aspect, at least a portion of the frictional member and at least a portion of the external force providing portion overlap each other in the direction that is orthogonal to the medium support surface of the medium support portion so that the thickness of the medium support portion can be further reduced, thereby leading to a further reduction in the height of the apparatus.

A ninth aspect of the invention is that, in the image reading apparatus according to the sixth aspect, the image reading apparatus further includes an advancing roller transporting a medium toward a reading position of the reading unit and a reverse feed path reversing a read medium after reading is performed and guiding the read medium to the advancing roller, in which the stationary-side roller and the moving-side roller included in the medium transport apparatus take in a medium that is partially discharged from the image reading apparatus and feed the medium to the reverse feed path, by reverse rotation of the stationary-side and moving-side rollers, and the roller support member assumes the second state when a front edge of the medium that is brought into the image reading apparatus reaches the advancing roller and the advancing roller transports the medium. In accordance with the ninth aspect, any one of the effects described in the sixth, seventh, and eighth aspects can be realized in a configuration in which reading of both sides of a medium is performed by using the medium transport apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
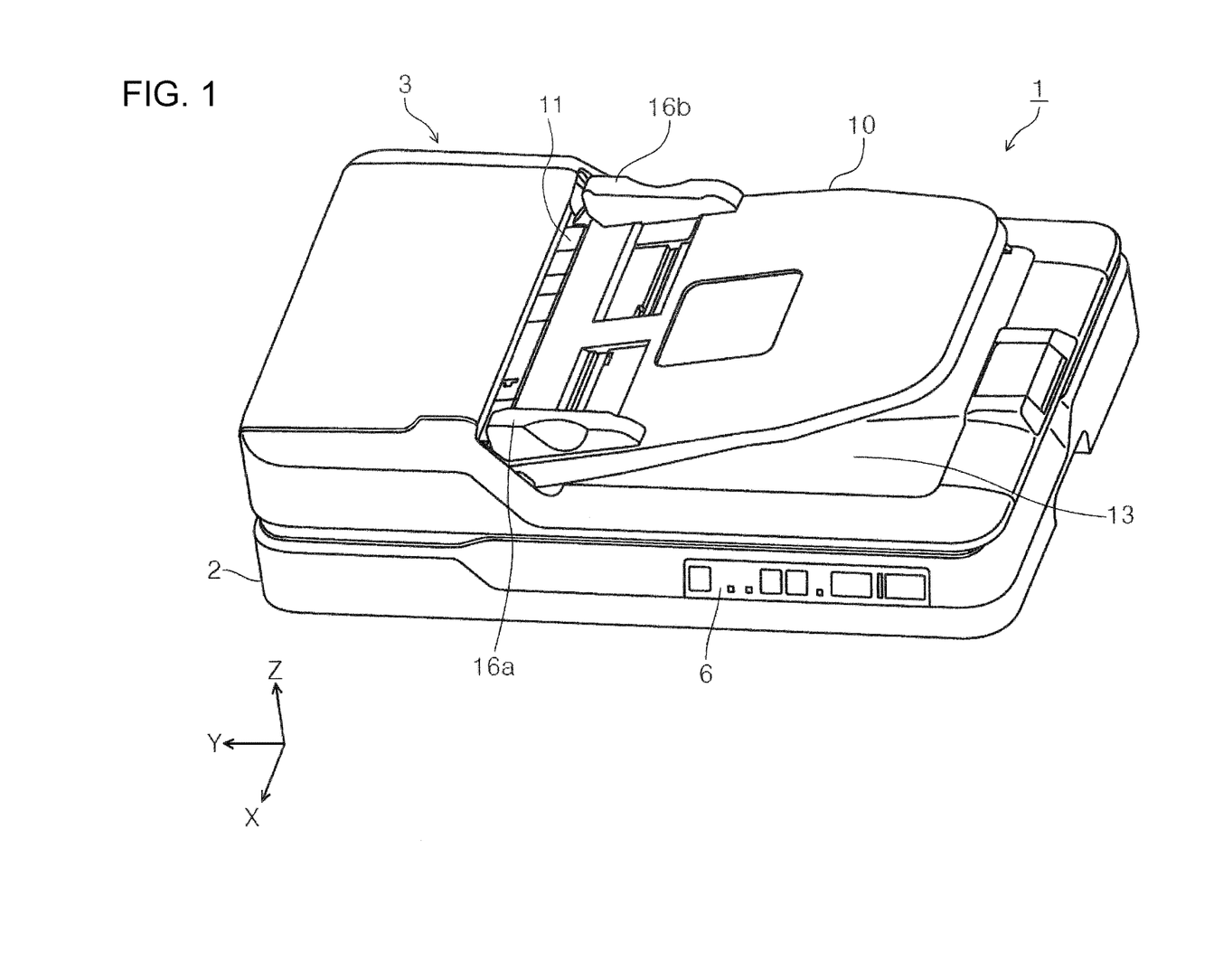
FIG. 1 is a perspective view illustrating an external appearance of an image reading apparatus according to the invention.
Figure 2:
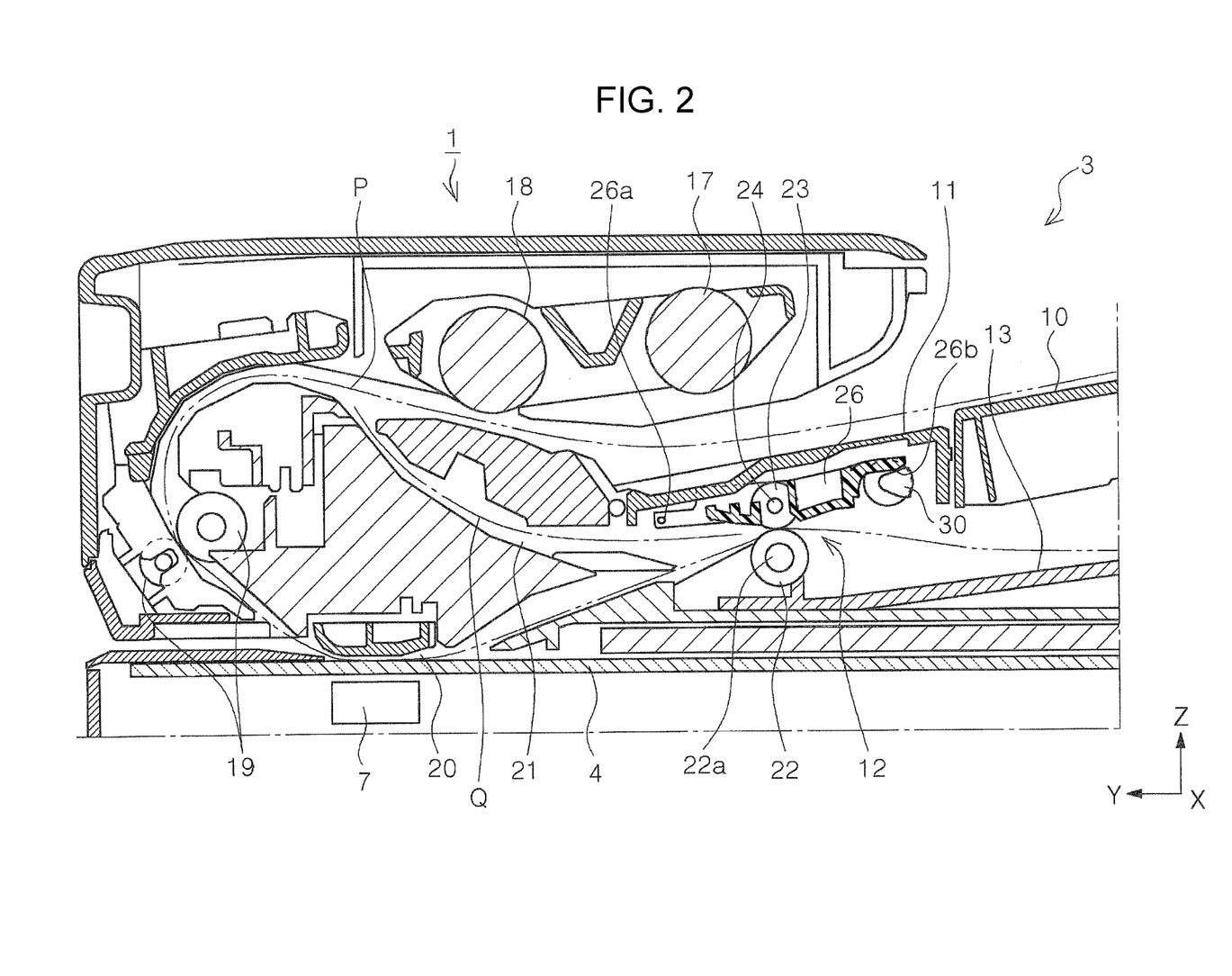
FIG. 2 is a side sectional view illustrating a medium transport path of an ADF.
Figure 3:
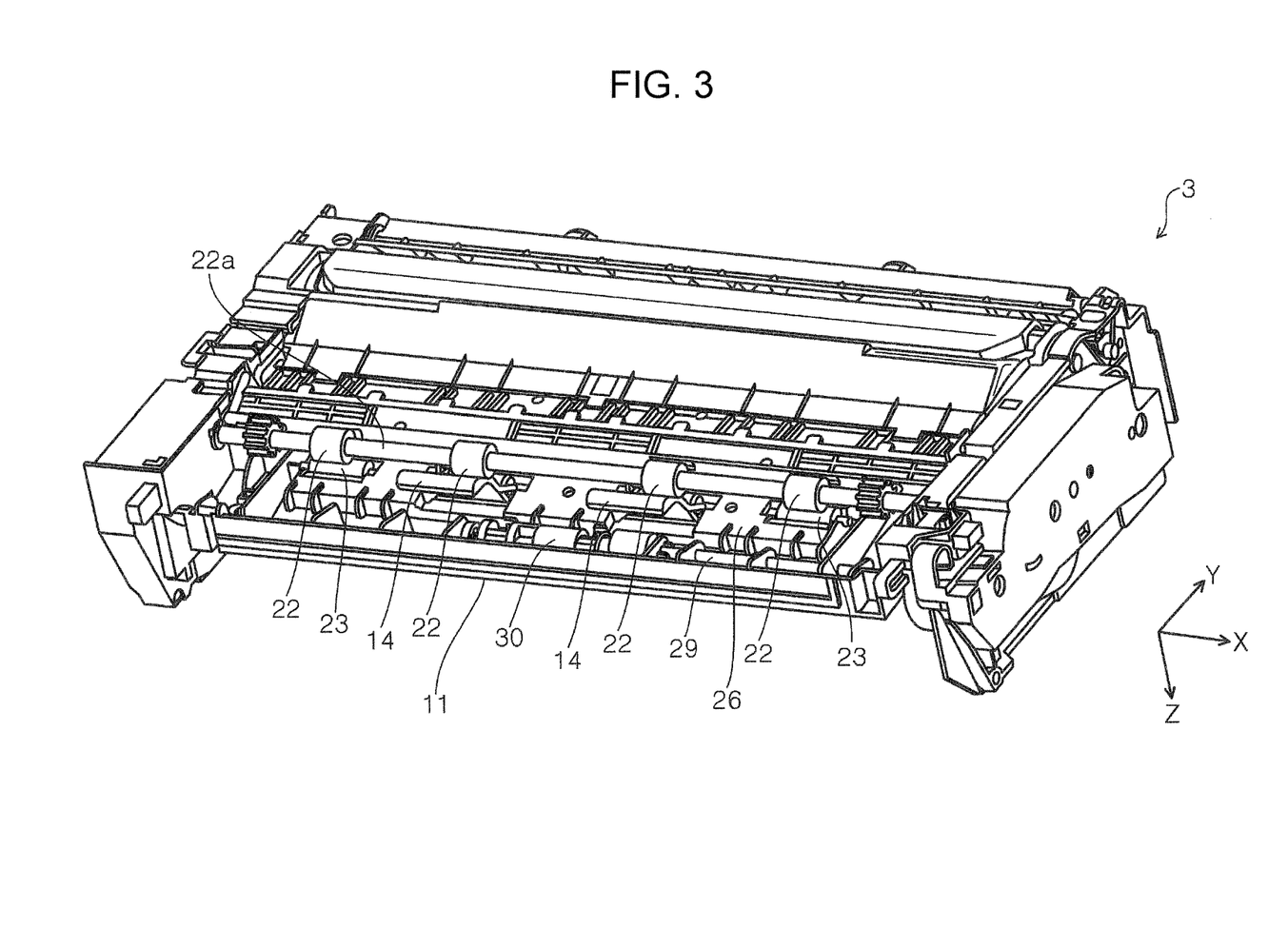
FIG. 3 is a perspective view of an ADF when viewed from the bottom.
Figure 4:
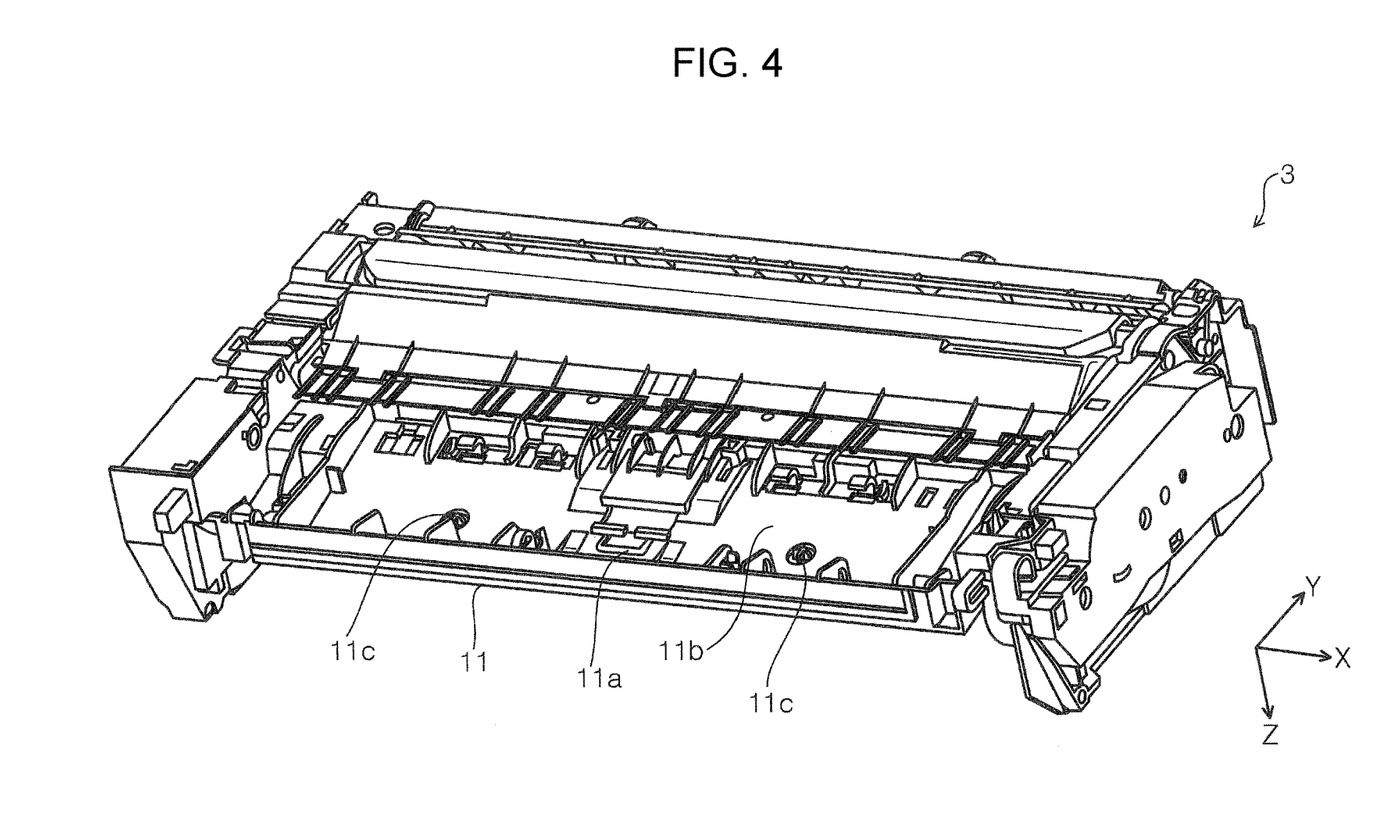
FIG. 4 is a perspective view illustrating a state in which a roller support member and rollers are removed from the ADF in FIG. 3.
Figure 5:
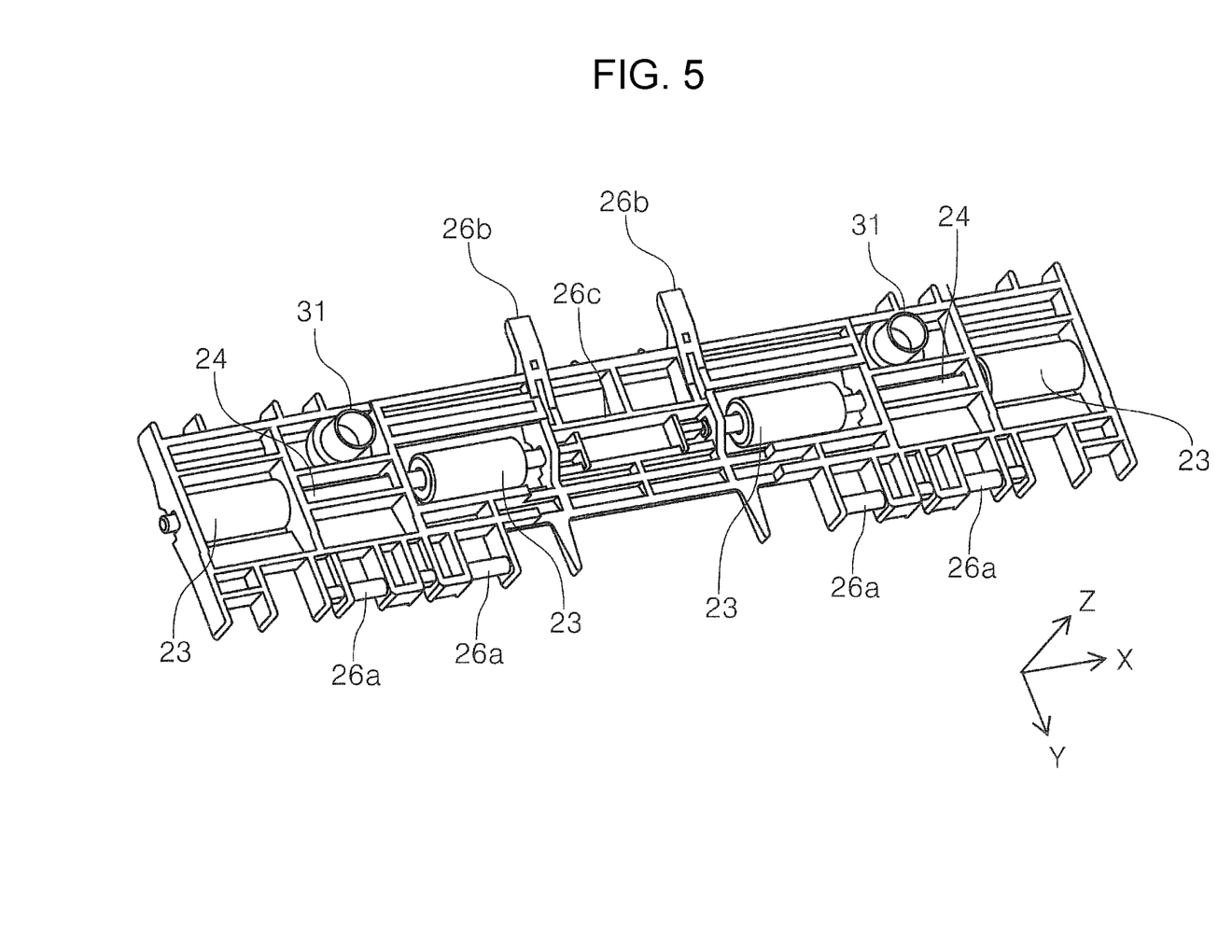
FIG. 5 is a perspective view illustrating a roller support member with discharge driven rollers attached when viewed from the top.

An image reading apparatus 1 according to an embodiment of the invention will be outlined with reference to the drawings. FIG. 1 is a perspective view illustrating an external appearance of an image reading apparatus 1 according to the invention. FIG. 2 is a side sectional view illustrating a medium transport path of an ADF 3. FIG. 3 is a perspective view of the ADF 3 when viewed from the bottom. FIG. 4 is a perspective view illustrating a state in which a roller support member 26 and rollers are removed from the ADF 3 in FIG. 3. FIG. 5 is a perspective view illustrating the roller support member 26 with discharge driven rollers 23 attached when viewed from the top.

Figure 6:
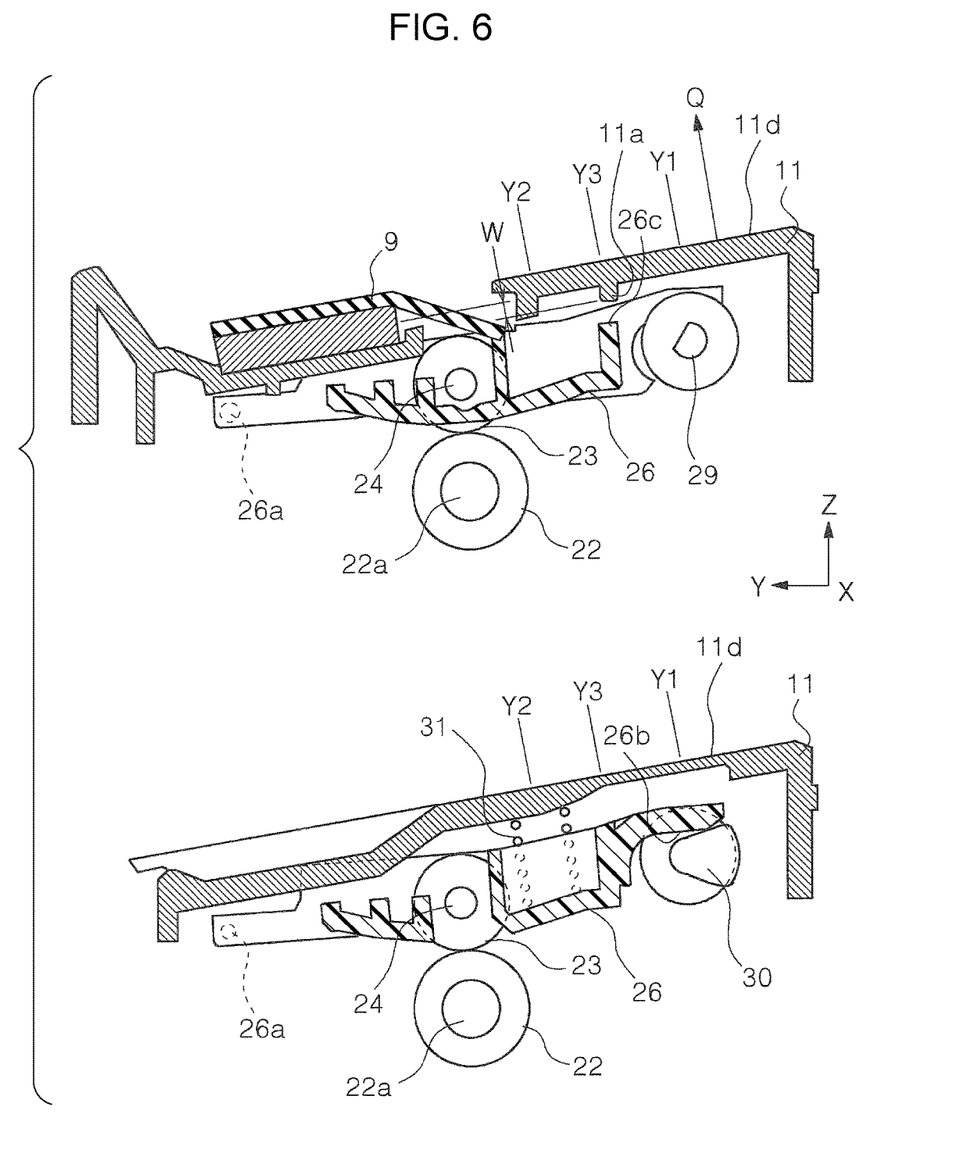
FIG. 6 is a side sectional view illustrating a medium support portion and a roller support member before a discharge driven roller is released.
Figure 7:
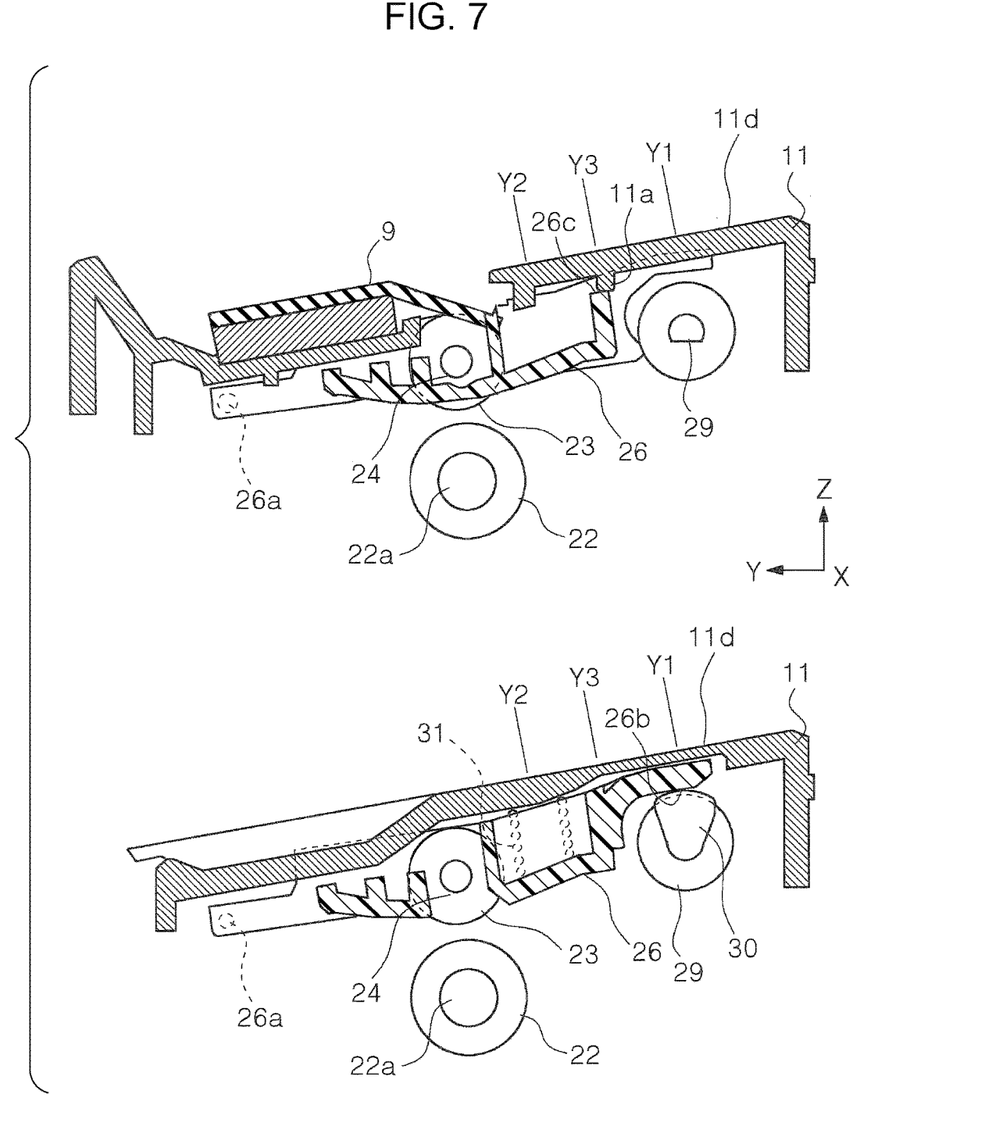
FIG. 7 is a side sectional view illustrating the medium support portion and the roller support member after the discharge driven roller is released.
Figure 8:
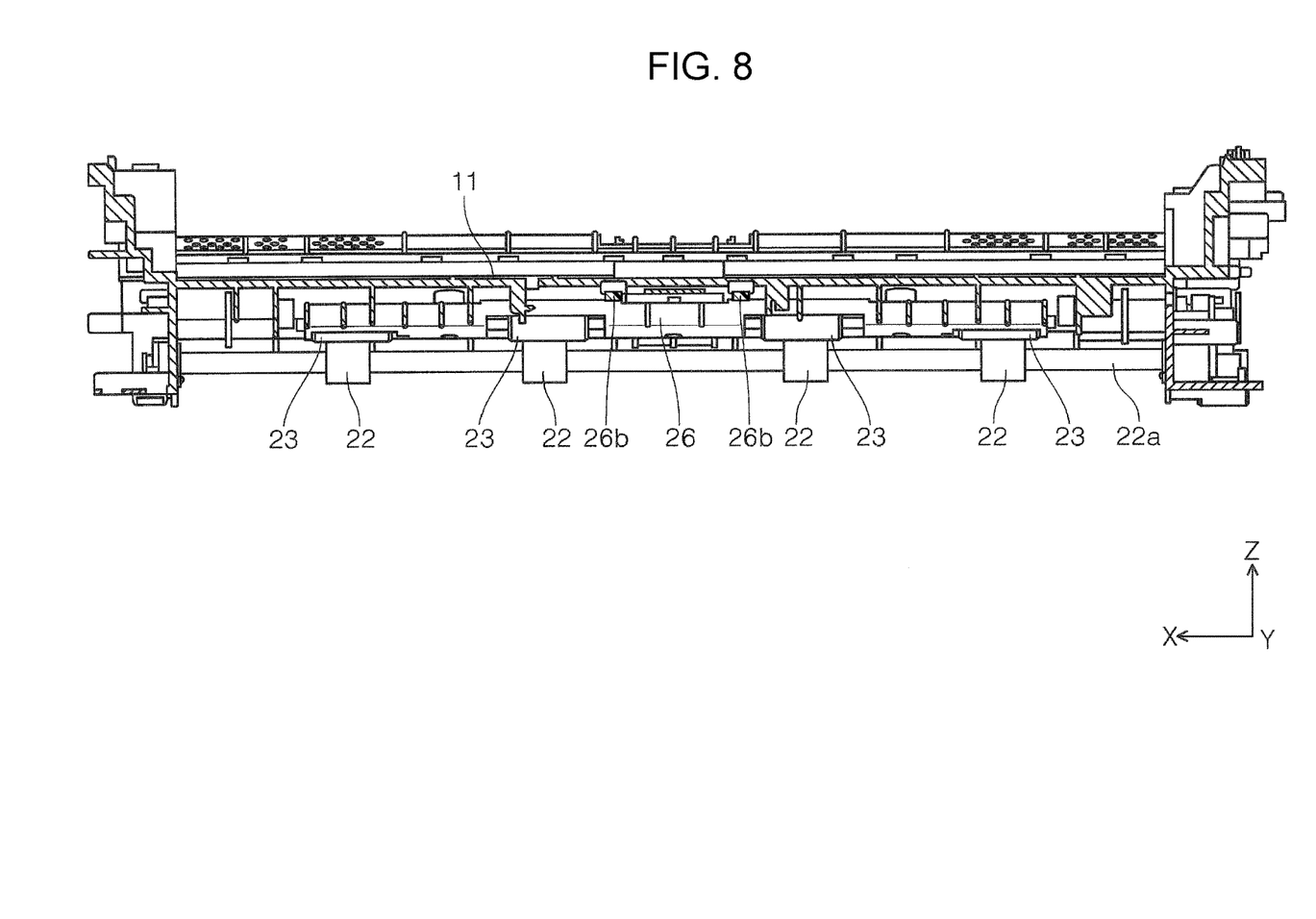
FIG. 8 is a cross sectional view illustrating a medium support portion and a roller support member before discharge driven rollers are released.
Figure 9:
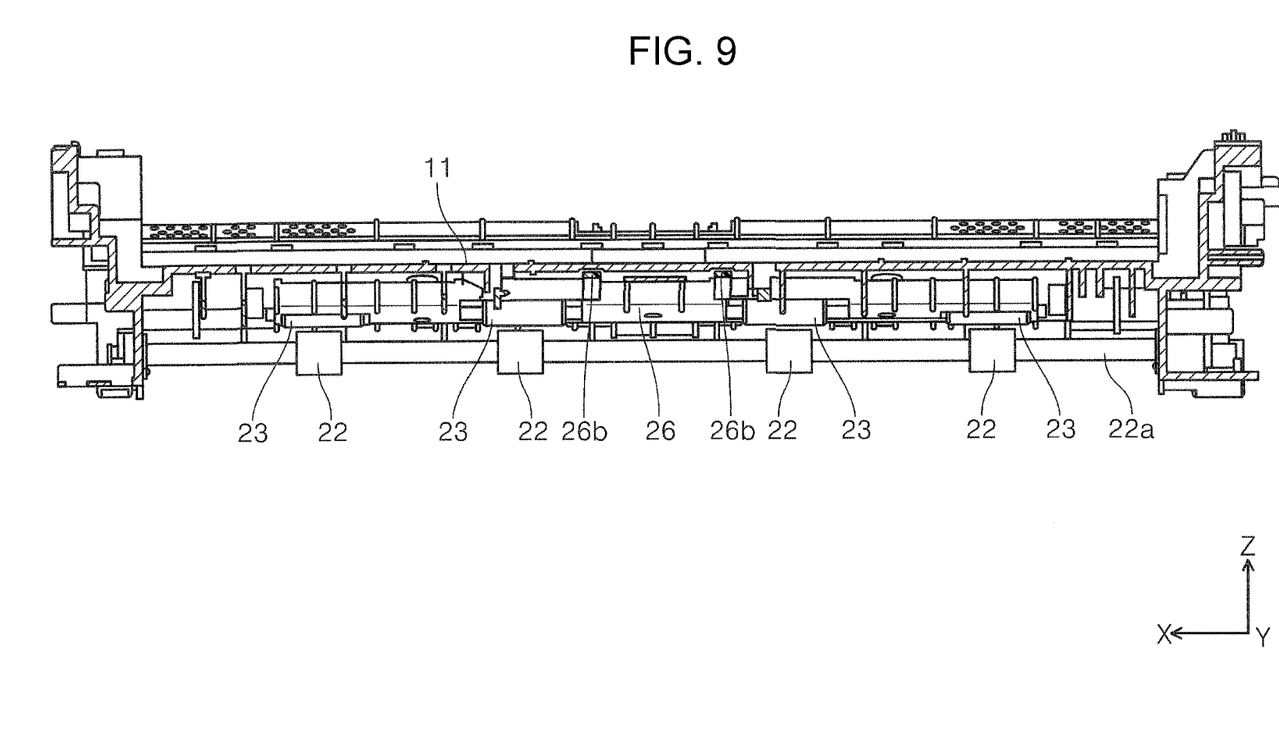
FIG. 9 is a cross sectional view illustrating the medium support portion and the roller support member after the discharge driven rollers are released.
Figure 10:
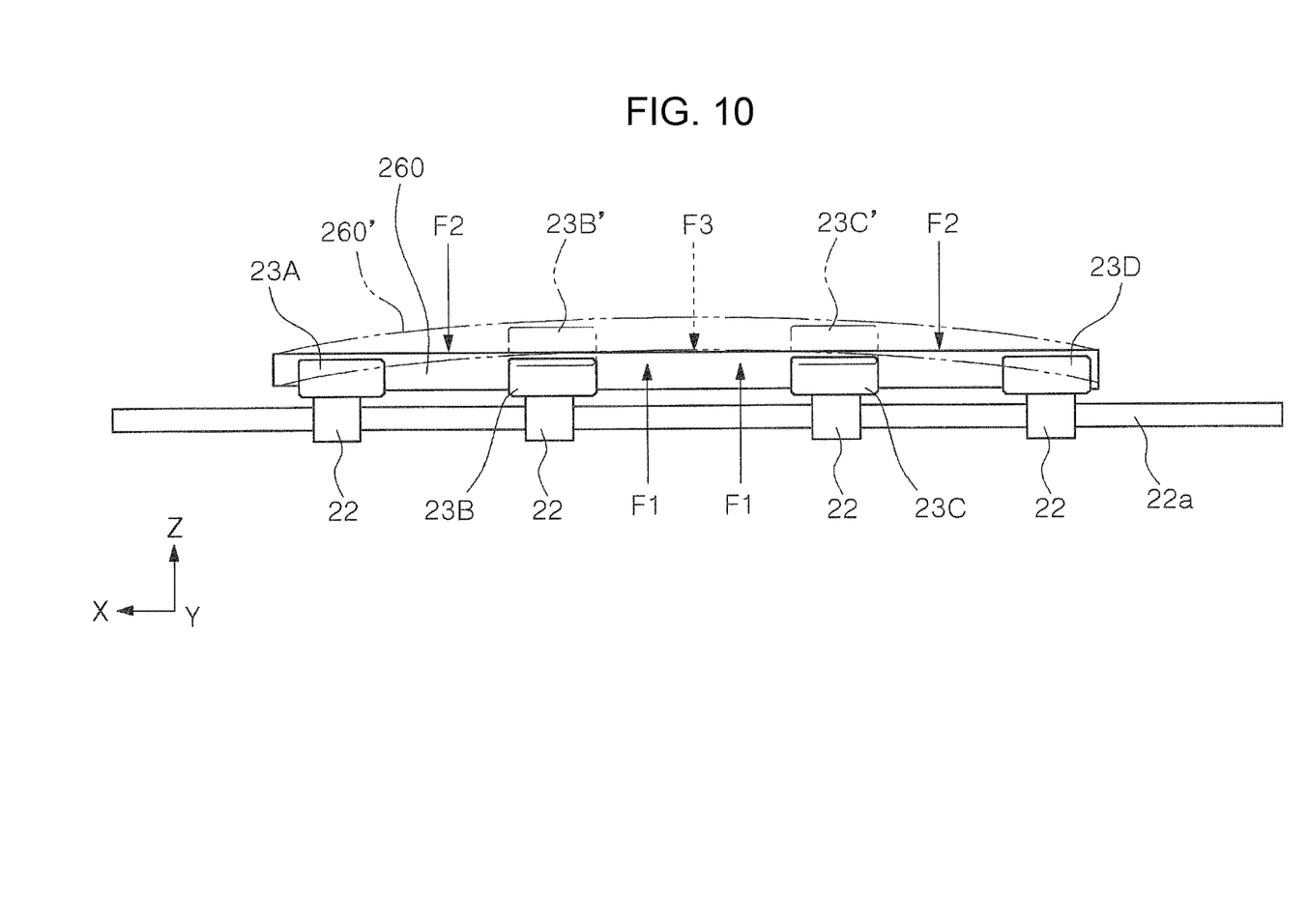
FIG. 10 is a front view illustrating discharge driving rollers, discharge driven rollers, and a roller support member.

In addition, FIG. 6 is a side sectional view illustrating the roller support member 26 and a medium support portion 11 before the discharge driven roller 23 is released. FIG. 7 is a side sectional view illustrating the roller support member 26 and the medium support portion 11 after the discharge driven roller 23 is released. FIG. 8 is a cross sectional view illustrating the roller support member 26 and the medium support portion 11 before the discharge driven rollers 23 are released. FIG. 9 is a cross sectional view illustrating the roller support member 26 and the medium support portion 11 after the discharge driven rollers 23 are released. FIG. 10 is a front view illustrating discharge driving rollers 22, discharge driven rollers 23, and a roller support member 260.

Note that in the X-Y-Z coordinate system shown in each of the drawings, the X direction represents the depth direction of the image reading apparatus, the Y direction represents the width direction of the apparatus, and the Z direction represents the height direction of the apparatus. Also note that in the present description, the rear side of the apparatus is defined as the side in the −X direction and the front side of the apparatus as the side in the +X direction. Similarly, the right side of the apparatus is defined as the side in the −Y direction and the left side of the apparatus as the side in the +Y direction. In addition, a transport direction in which a document is transported in the image reading apparatus 1 is referred to as "downstream" and the opposite direction is referred to as "upstream".

As illustrated in FIG. 1, the image reading apparatus 1 includes a main unit 2 and an auto document feeder (ADF) 3 (hereinafter referred to as "ADF 3") that serves as a "medium transport apparatus" according to the invention. The ADF 3 is configured to be able to assume a closed position in which the ADF 3 is closed (FIG. 1) and an open position in which the ADF 3 is open (not shown) with respect to the main unit 2. When the ADF 3 is in the open position, a scanner glass 4 on which a document is placed (see FIG. 2) is exposed.

The main unit 2 includes the scanner glass 4 and an operation unit 6. The scanner glass 4 is formed of a flat and transparent glass plate, and the top surface of the scanner glass 4 serves as a document placing surface on which a document to be scanned to an image is placed. The operation unit 6 includes a power switch and buttons for changing apparatus configurations, which are used for operating the image reading apparatus 1.

As illustrated in FIG. 1 by way of example, ADF 3 includes medium support portions 10, 11 that support a document, which serves as a "medium", and a medium receiving tray 13 that receives a document that is read and discharged from the ADF 3. In general, the ADF 3 is configured to curl and invert a document that has been placed on the medium support portions 10, 11, of the ADF 3. The ADF 3 subsequently reads the document at a reading position 20 and discharge it toward the medium receiving tray 13 by using a discharge roller pair 12. A more detailed description will be given below.

The medium support portion 10 is formed so as to be able to rotate, in a direction away from the medium receiving tray 13 (not shown), from an orientation in which a document is placed (FIG. 1), which enables the medium support portion 10 to assume an open state with respect to the medium receiving tray 13. With the medium support portion 10 assuming the open state, a medium discharged onto the medium receiving tray 13 can be easily removed. In addition, the medium support portion 10 includes edge guides 16a, 16b for guiding the widthwise ends (the ends in the X direction) of a placed document.

As illustrated in FIG. 2, a feed roller 17, which is rotationally driven by a drive source (not shown), is provided above the medium support portion 11. The feed roller 17 comes into contact with the topmost document of a plurality of documents placed on the medium support portions 10, 11 and transports the topmost document downstream.

A separation roller 18 and an advancing roller pair 19 are provided on the downstream side of the feed roller 17 in the document transport direction. Note that the separation roller 18 and the advancing roller pair 19 are formed so as to be rotationally driven by driving force provided by a drive source (not shown).

The document, which has been sent downstream in the transport direction by the feed roller 17, is transported further downstream to the reading position 20 by the advancing roller pair 19. The document that has been transported to the reading position 20 is read by a reading unit 7.

In the embodiment, the reading unit 7 is formed so as to extend in the main scanning direction (X direction) and be movable by means of a moving mechanism (not shown) in the sub-scanning direction (Y direction) that intersects the main scanning direction. The reading unit 7 includes a reading sensor (not shown). As an example of the reading sensor, an optical sensor using a charge-coupled device (CCD) or a contact image sensor (CIS) can be used.

The document, which has been read by the reading unit 7 at the reading position 20, is discharged onto the medium receiving tray 13 by means of a discharge roller pair 12 that is provided downstream of the reading position 20. Note that the discharge driving roller 22 of the discharge roller pair 12, which serves as a medium transport roller pair, is rotationally driven by the drive source (not shown). The discharge driven roller 23 of the discharge roller pair 12 is formed so as to rotate passively by touching the discharge driving roller 22 or the document.

Also note that in the case of reading both sides of the document, the document is sent to a reverse feed path 21 by reversely rotating the discharge driving roller 22 after one side (front side) of the document is read. The document, which has been sent to the reverse feed path 21, reaches the advancing roller pair 19 again so as to be transport downstream. Subsequently, the other side (back side) of the document is read by the reading unit 7 at the reading position 20. Note that FIG. 2 illustrates a configuration in which the reverse feed path 21 is provided. However, for example, the reading unit may be provided on both sides of the document transport path, instead of providing the reverse feed path 21, so as to read both sides of the document in one-way transport. Also note that additional rollers other than those illustrated in FIG. 2 may be provided on the document transport path.

A general configuration of the ADF 3 has been described. Next, a configuration of the discharge driven roller 23 will be described further in detail. As illustrated in FIGS. 3, 8, and 9, the discharge driving roller 22 and the discharge driven roller 23 form a pair, and a plurality of the pairs (four pairs in the embodiment) are provided in the document width direction (X direction) with an appropriate spacing between each pair. Note that reference numeral 14 in FIG. 3 denotes pressing members that press a document that is being discharged.

Reference numeral 22a denotes a rotating shaft of the discharge driving rollers 22. The rotating shaft is formed, for example, of a metal shaft. The discharge driving rollers 22 disposed on the rotating shaft 22a can be formed of various types of materials, such as, for example, ethylene-propylene rubber (EPDM), chloroprene rubber (CR), styrene-butadiene rubber (SBR), and silicone.

The discharge driven rollers 23 can be formed of a material similar to that of the discharge driving rollers 22. The discharge driven rollers 23 are supported by the roller support member 26 via a rotating shaft 24. The rotating shaft 24 is formed, for example, of a metal shaft. According to the embodiment, a plurality of the rotating shafts 24 (two in the embodiment) are provided for one roller support member 26 in the document width direction (X direction) with an appropriate spacing between adjacent rotating shafts 24. In the embodiment, two rotating shafts 24 are provided at symmetrical positions in the roller support member 26 with respect to the center position thereof in the document width direction.

The roller support member 26, which is formed from resin in the embodiment, is disposed so as to allow the roller support member 26 to swing with swing shafts 26a serving as the swing center when viewed from a side of the document transport path, as illustrated in FIGS. 2, 5, 6, and 7. Note that the roller support member 26 is formed so as to be able to swing with respect to a frame (not shown).

As illustrated in FIG. 5, in the roller support member 26, abutted portions 26b are provided near the center thereof in the document width direction (X direction). The abutted portions 26b are formed so as to protrude toward the downstream side in the document transport direction. According to the embodiment, two abutted portions 26b are provided at symmetrical positions with respect to the center position in the document width direction.

As illustrated in FIGS. 2 and 6 to 9, the roller support member 26 is provided under the medium support portion 11. In other words, the medium support portion 11 is provided over the roller support member 26. In addition, urging springs 31, which are examples of urging devices, are provided between the medium support portion 11 and the roller support member 26. In the embodiment, each urging spring 31 is formed of a compression coil spring.

In the embodiment, a plurality of the urging springs 31 (two in the embodiment) are provided in the roller support member 26 in the document width direction (X direction) with an appropriate spacing therebetween (FIG. 5). According to the embodiment, two urging springs 31 are provided in the roller support member 26 at symmetrical positions with respect to the center position thereof in the document width direction. In FIG. 4, reference numeral 11c represents spring holders for holding the urging springs 31 on the bottom side 11b of the medium support portion 11. The roller support member 26 is urged, by the urging force of the urging springs 31, toward a first state, that is, in a direction in which the discharge driven rollers 23 come into contact with the discharge driving rollers 22.

A cam 30 is disposed at a position opposing each of the abutted portions 26b formed in the roller support member 26. The cam 30 is disposed on the rotating shaft 29 and formed so as to rotate together with the rotation of the rotating shaft 29. The rotating shaft 29 is rotationally driven by a drive source (not shown).

The rotation of the cam 30 pushes up each abutted portion 26b of the roller support member 26 against the spring force of the urging springs 31. Thereby, the roller support member 26 swings to cause the discharge driven rollers 23 to separate from the discharge driving rollers 22. In other words, the cam 30 shifts the roller support member 26 from a first state to a second state against the urging force of the urging springs 31. Note that in the embodiment, the first state is a state of the roller support member 26 when the discharge driven rollers 23 come into contact with the discharge driving rollers 22, and the second state is a state of the roller support member 26 when the discharge driven rollers 23 separate from the discharge driving rollers 22.

FIGS. 7 and 9 are views illustrating the second state of the roller support member 26 after the discharge driven rollers 23 are released whereas FIGS. 6 and 8 are views illustrating the first state of the roller support member 26 before the discharge driven rollers 23 are released. Thus, the discharge driving rollers function as "stationary-side rollers" and the discharge driven rollers function as "moving-side rollers".

Note that the views at the top in FIGS. 6 and 7 are views illustrating the roller support member 26 and the medium support portion 11 that are cut along the Y-Z plane at the position of an external force providing portion 11a (described below) in the document width direction. The views at the bottom in FIGS. 6 and 7 are views illustrating the roller support member 26 and the medium support portion 11 that are cut along the Y-Z plane at the position of one of the abutted portions 26b in the document width direction.

Also note that as illustrated in FIG. 2, the image reading apparatus 1 according to the embodiment includes a reverse feed path 21 in which a read document is reversed in its course and guided to the advancing roller pair 19. The discharge roller pair 12 has such a function that the document that is partially discharged from the apparatus is brought back into the apparatus and fed into the reverse feed path 21 by use of the reverse rotation of the discharge roller pair 12. The front edge of the document that has been brought back into the apparatus subsequently reaches the advancing roller pair 19. When the advancing roller pair 19 transports the document, the roller support member 26 assumes the second state, that is, the state in which the discharge driven rollers 23 separate from the discharge driving rollers 22.

Next, in FIG. 4, reference numeral 11a denotes an external force providing portion that provides an external force to the roller support member 26. Functions of the external force providing portion are described as follows. As described above, urging forces by the urging springs 31 and push-up forces by the cams 30 are exerted on the roller support member 26, which leads to deformation of the roller support member 26. FIG. 10 schematically illustrates deformation of a roller support member that has a configuration without the external force providing portion 11a. Reference numeral 260 denotes a member that corresponds to the roller support member 26.

In FIG. 10, the arrows F1 indicate external forces that the cams 30 exert on the roller support member 260 (first external forces), and the arrows F2 indicate external forces that the urging springs 31 exert on the roller support member 260 (second external forces). The positions at which the first external forces F1 act do not align with the positions at which the second external forces F2 act in the document width direction (X direction). A layout in the apparatus may require the positions at which external forces act to be shifted as such.

In the example illustrated in FIG. 10, the second external forces F2 that the urging springs 31 provide to the roller support member 260 act on outer portions of the roller support member 260 in the document width direction (X direction) while the first external forces F1 that the cams 30 provide to the roller support member 260 act on an inner portion with respect to the second external forces F2. Consequently, when the cams 30 provide the first external forces F1 to the roller support member 260 and push up the roller support member 260, the roller support member 260 is warped with a convex-upward profile as indicated by the two-dot chain line and reference numeral 260'.

Here, two discharge driven rollers 23B, 23C that are disposed in the inner portion in the document width direction (X direction) can separate (or be released) from the discharge driving rollers 22. On the other hand, two discharge driven rollers 23A, 23D that are disposed in the outer portions in the document width direction (X direction) cannot sufficiently separate (or be released) from the discharge driving rollers 22 due to the warping of the roller support member 260 or may not separate at all from the discharge driving roller 22.

However, the medium support portion 11 according to the embodiment is equipped with the external force providing portion 11a that exerts a third external force F3 in a direction for restraining the warping generated in the roller support member. As illustrated in FIGS. 4, 6, and 7, the external force providing portion 11a is formed in the medium support portion 11 at a position opposing the roller support member 26.

As illustrated in the view at the top in FIG. 6, when each discharge driven roller 23 is in the state before it is released (the first state of the roller support member 26), the external force providing portion 11a formed in the medium support portion 11 and the abutting portion 26c formed in the roller support member 26 are separated. The cam 30 rotates from this state and causes the discharge driven roller 23 to be in the released state (the second state of the roller support member 26). The abutting portion 26c subsequently abuts against the external force providing portion 11a. Thereby, the external force providing portion 11a provides a third external force F3, such as that illustrated in FIG. 10, to the roller support member 26 via the abutting portion 26c.

The third external force F3 acts on the roller support member 26 in a direction for restraining the warping of the roller support member 26 generated by the first external forces F1 that the cams 30 exert on the roller support member 26 and by the second external forces F2 that the urging springs 31 exert on the roller support member 26. This can restrain the warping of the roller support member 26 and reliably separate the discharge driven rollers 23, which are the moving-side rollers, from the discharge driving rollers 22, which are the stationary-side rollers. As a result, document transport can be properly performed.

Note that the external force providing portion 11a according to the embodiment abuts an abutting portion provided in the roller support member 26 when the cams 30 shift the roller support member 26 to the second state. In other words, the external force providing portion 11a is formed of a fixedly disposed structural portion. Thereby, the external force providing portion 11a does not need to be operated and thus can be formed in a structurally simple and low cost configuration.

Also note that in the embodiment, the first external forces F1 that the cams 30 provide to the roller support member 26 and the second external forces F2 that the urging springs 31 provide to the roller support member 26 act on the roller support member 26 at symmetrical positions with respect to the center position of the roller support member 26 in the rotation axis direction (X direction) of the discharge driven rollers 23, as illustrated in FIG. 10. Thus, it is preferable that the third external force F3 that the external force providing portion 11a provides to the roller support member 26 act on the roller support member 26 at the center position, or symmetrical positions relative to the center position, of the roller support member 26 in the rotation axis direction of the discharge driven rollers 23.

Thus, the restraining action suppressing warping of the roller support member 26 due to the third external force F3 balances the warping action of the roller support member 26 due to the first external forces F1 and the second external forces F2 in the X direction. This enables the shape of the roller support member 26 to be favorably maintained.

Note that in the embodiment, the first external forces F1 that the cams 30 provide to the roller support member 26 and the second external forces F2 that the urging springs 31 provide to the roller support member 26 act on the roller support member 26 at different positions in the document transport direction. The third external force F3 that the external force providing portion 11a provides to the roller support member 26 acts on the roller support member 26 at a position between the positions at which the first external forces F1 act and the position at which the second external forces F2 act in the document transport direction.

This situation is illustrated in FIG. 6. In FIG. 6, the position Y1 indicates a position (position in the document transport direction) at which the first external forces F1 act and the position Y2 indicates a position (position in the document transport direction) at which the second external forces F2 act. The position Y3 indicates a position (position in the document transport direction) at which the third external force F3 acts. As illustrated, the position Y1 does not align with the position Y2 in the document transport direction, and the position Y3 is located between the position Y1 and the position Y2.

Thus, even when the position Y1 at which the first external forces F1 act needs to be shifted from the position Y2 at which the second external forces F2 act in the document transport direction due to layout requirements in the apparatus, an extent in the document transport direction in which the first, second, and third external forces act can be reduced to a minimum and thereby the deformation of the roller support member 26 in the document transport direction can be reduced to a minimum.

Moreover, in the embodiment, a plurality of the discharge driven rollers 23 are provided in the roller support member 26 in the rotation axis direction (X direction), and a plurality of the rotating shafts 24 of the discharge driven rollers 23 are provided in the rotation axis direction, as illustrated in FIG. 5. In addition, a plurality of the discharge driven rollers 23 (two in the embodiment) are provided in each rotating shaft 24 at symmetrical positions with respect to the center position of each rotating shaft 24 in the rotation axis direction. Moreover, each of the urging springs 31, which are the urging devices, urge the roller support member 26 at the center position of each rotating shaft 24 in the rotation axis direction.

Thus, the urging springs 31, each of which urges the roller support member 26 at the center position of each rotating shaft 24 in the rotation axis direction of the discharge driven rollers 23, enable a plurality of the discharge driven rollers 23 supported by each rotating shaft 24 to enable well-balanced contact with a document.

In the embodiment, the medium support portion 11 that supports a document to be transported toward the reading unit 7 is provided over the roller support member 26, and the medium support portion 11 includes a frictional member 9 that applies a frictional force to the supported document, as illustrated FIGS. 6 and 7. The frictional member 9 may be formed of an elastic material, such as, for example, an elastomer or cork. The external force providing portion 11a is formed in the medium support portion 11 on a side opposing the roller support member 26 and is arranged at a position that is shifted from the position of the frictional member 9 in the document transport direction. This can reduce the thickness of the medium support portion 11, which leads to a reduction in the height of the apparatus.

Furthermore, in the embodiment, at least a portion of the frictional member 9 and at least a portion of the external force providing portion 11a overlap each other in a direction Q that is orthogonal to the medium support surface 11d of the medium support portion 11, as illustrated in the view on the top in FIG. 6. In FIG. 6, the extent W represents the overlapped region. The fact that at least a portion of the frictional member 9 and at least a portion of the external force providing portion 11a overlap each other in the direction Q that is orthogonal to the medium support surface 11d of the medium support portion 11 as illustrated can further reduce the thickness of the medium support portion 11, which leads to a further reduction in the height of the apparatus.

The entire disclosure of Japanese Patent Application No. 2016-129068, filed Jun. 29, 2016 is expressly incorporated by reference herein.

What is claimed is:

1. A medium transport apparatus comprising:
    a medium transport roller pair disposed on a medium transport path along which a medium is transported, the medium transport roller pair including a stationary-side roller and a moving-side roller, the moving-side roller configured to come into contact with the stationary-side roller and configured to separate from the stationary-side roller after being in contact with the stationary-side roller;
    a roller support member formed so as to support the moving-side roller, the roller support member configured to assume a first state in which the roller support member causes the moving-side roller to be in contact with the stationary-side roller and configured to assume a second state in which the roller support member causes the moving-side roller to separate from the stationary-side roller;
    an urging device that is configured to cause the roller support member to assume the first state;
    a cam formed so as to engage the roller support member and configured to cause the roller support member to shift from the first state to the second state against the urging force of the urging device; and
    an external force providing portion configured to exert, while the roller support member is shifted by the cam from the first state to the second state, a third external force on the roller support member, the third external force being exerted on the roller support member in a direction that restrains warping that is generated in the roller support member by a first external force that the cam exerts on the roller support member while shifting the roller support member from the first state to the second state and by a second external force that the urging device exerts on the roller support member when causing the roller support member to assume the first state.

2. The medium transport apparatus according to claim 1, wherein the external force providing portion abuts an abutting portion provided in the roller support member when the roller support member is shifted by the cam to be in the second state.

3. The medium transport apparatus according to claim 1, wherein
    the first external force and the second external force act on the roller support member at symmetrical positions with respect to a center position of the roller support member in a rotation axis direction of the moving-side roller, and
    the third external force acts on the roller support member at the center position of the roller support member or at symmetrical positions with respect to the center position in the rotation axis direction of the moving-side roller.

4. The medium transport apparatus according to claim 1, wherein
    the first external force and the second external force act on the roller support member at different positions in a medium transport direction, and
    the third external force acts on the roller support member at a position between the position at which the first external force acts and the position at which the second external force acts in the medium transport direction.

5. The medium transport apparatus according to claim 1, wherein
    the roller support member includes a plurality of the moving-side rollers provided in a rotation axis direction of the moving-side rollers and a plurality of rotating shafts of the moving-side rollers provided in the rotation axis direction,
    each of the rotating shafts includes a plurality of the moving-side rollers provided at symmetrical positions with respect to a center position of each of the rotating shafts in the rotation axis direction, and
    the urging device urges the roller support member at the center positions of each of the rotating shafts in the rotation axis direction.

6. An image reading apparatus, comprising:
    a reading unit reading a side of a medium; and the medium transport apparatus according to claim 1 that is provided at a position at which a medium read by the reading unit is discharged from the image reading apparatus.

7. The image reading apparatus according to claim 6, further comprising a medium support portion provided above the roller support member so as to support a medium that is transported toward the reading unit, wherein the medium support portion includes a frictional member providing a frictional force between the medium support portion and a supported medium, and the external force providing portion is formed in the medium support portion on a side opposing the roller support member and is arranged at a position that is shifted from a position of the frictional member in a medium transport direction.

8. The image reading apparatus according to claim 7, wherein at least a portion of the frictional member and at least a portion of the external force providing portion overlap each other in a direction orthogonal to a medium support surface of the medium support portion.

9. The image reading apparatus according to claim 6, further comprising:

an advancing roller transporting a medium toward a reading position of the reading unit; and a reverse feed path reversing a read medium after reading is performed and guiding the read medium to the advancing roller, wherein the stationary-side roller and the moving-side roller included in the medium transport apparatus take in a medium that is partially discharged from the image reading apparatus and feed the medium to the reverse feed path, by reverse rotation of the stationary-side and moving-side rollers, and the roller support member assumes the second state when a front edge of the medium that is brought into the image reading apparatus reaches the advancing roller and the advancing roller transports the medium.

* * * * *